(No Model.) 2 Sheets—Sheet 1.
N. R. STREETER & J. ANSTICE.
TRAP.

No. 595,741. Patented Dec. 21, 1897.

Witnesses
Geo. E. Frech.
James V. Bevans

Inventor
Nelson R. Streeter,
Josiah Anstice,
by Pattison & Nesbit, Attorneys (No Model.) 2 Sheets—Sheet 2.
N. R. STREETER & J. ANSTICE.
TRAP.
No. 595,741. Patented Dec. 21, 1897.
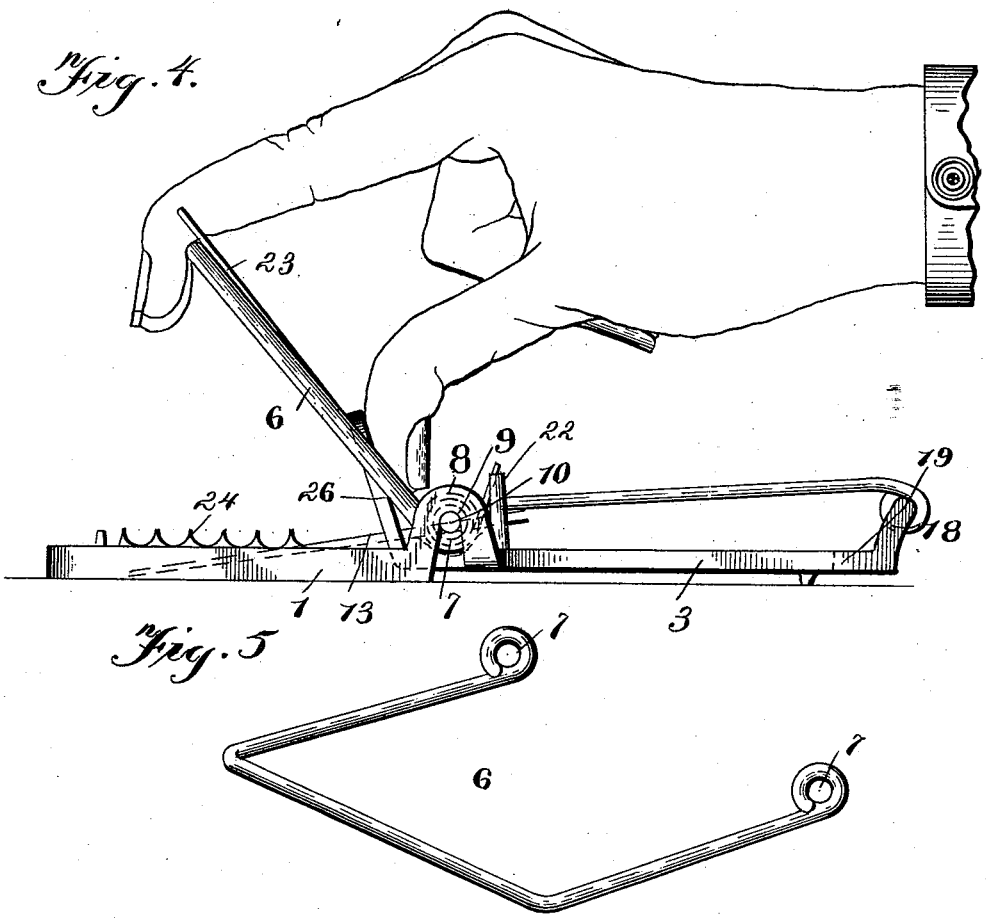
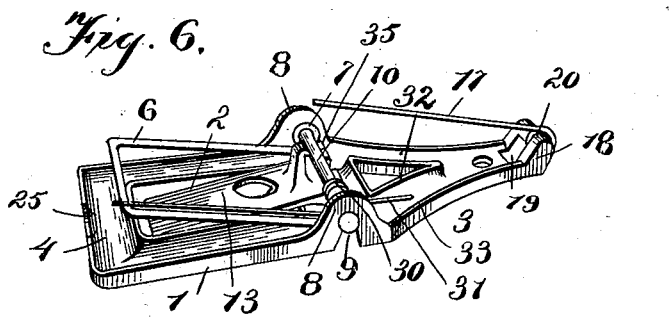
Witnesses
Geo. E. Fuch
James W. Beraus
Inventors
Nelson R. Streeter,
Josiah Anstice,
by Pattison & Nesbit
Attorneys

UNITED STATES PATENT OFFICE.

NELSON R. STREETER, OF GROTON, AND JOSIAH ANSTICE, OF ROCHESTER, NEW YORK.

TRAP.

SPECIFICATION forming part of Letters Patent No. 595,741, dated December 21, 1897.

Application filed December 1, 1896. Serial No. 614,111. (No model.)

*To all whom it may concern:*

Be it known that we, NELSON R. STREETER, of Groton, in the county of Tompkins, and JOSIAH ANSTICE, of Rochester, in the county of Monroe, State of New York, have invented certain new and useful Improvements in Traps; and we do hereby declare the following to be a full, clear, and exact description of the invention, such as will enable others skilled in the art to which it pertains to make and use it, reference being had to the accompanying drawings, which form part of this specification.

Our invention relates to improvements in traps which are adapted for catching mice and rats and pertains to a trap of the smash-down or jaw type, all of which will be fully described hereinafter and particularly referred to in the claims.

The object of our invention is to produce a cheap trap, effective and durable, and so constructed that rivets are not required to hold the parts in their place, and in certain details of construction, which will be fully described hereinafter.

Figure 1:
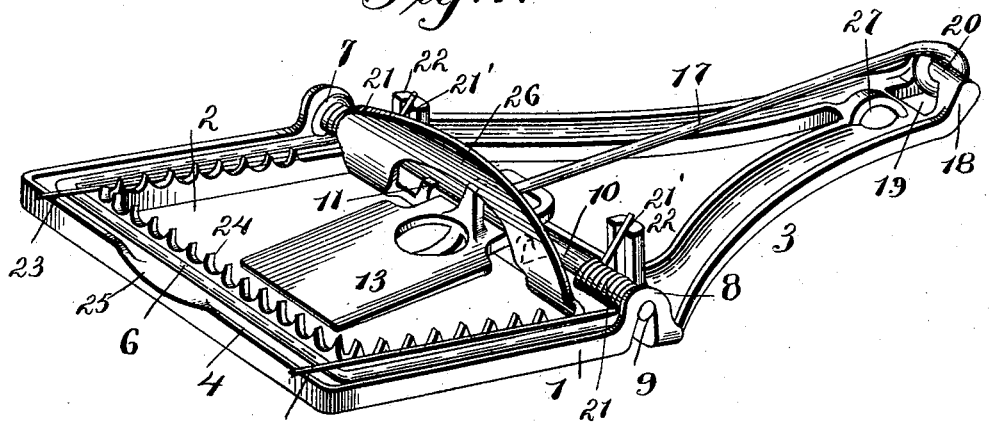
Figure 2:
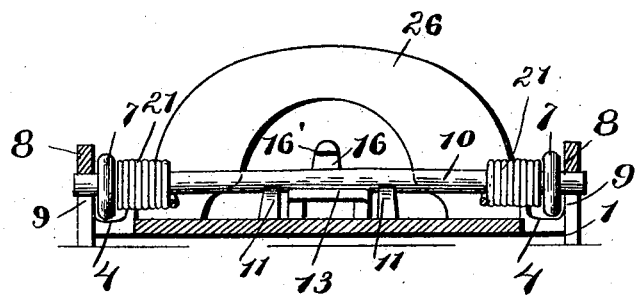
Figure 3:
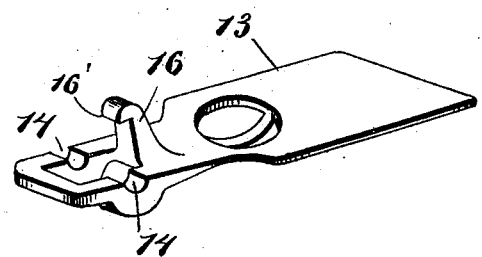

In the accompanying drawings, Figure 1 is a perspective view of our trap adapted for catching rats. Fig. 2 is a transverse sectional view taken just in rear of the smash-down pivotal rod or shaft. Fig. 3 is a detached perspective view of the combined bait and tripping platform. Fig. 4 is a side view showing the trap in the act of being opened and the hands of the operator in the proper position for lifting the smash-down bail. Fig. 5 is a detached view of the smash-down bail. Fig. 6 is a perspective view of our trap modified and adapted for catching mice.

The base of our trap is cast in a single piece, the forward portion 1 being rectangular in shape, with an open center portion 2 and a rearwardly-extending V-shaped portion 3. The forward rectangular portion 1 in both forms of our trap is provided at its upper side with a groove 4 to receive the smash-down bail 6. This smash-down bail 6, as shown in Fig. 5, consists of a wire in U-shape form, the wire being sufficiently large to be practically rigid, and the ends of the wire turned upward, forming upwardly-extending eyes 7. At the junction of the rectangular portion 1 and the V-shaped portion 3 are the upwardly-extending ears 8, having openings 9, as clearly shown, which permit the free passage therethrough of the pivotal rod or wire 10 for the smash-down bail. This pivotal rod is held against endwise movement in the trap without riveting through the medium of the lugs 11, which extend upward from the rear end of the rectangular portion of the base and directly under and engaging the under side of the pivotal rod. These lugs project upward a sufficient distance to cause or necessitate the ends of the pivotal rod being bent downward under tension in order to pass through the openings in the ears. In this way the central portion of the pivotal rod is normally slightly upward, and thus under frictional tension with the lugs and the ears which hold it firmly against any endwise movement in the frame and without the necessity of riveting. These lugs 11 serve a further function, in that they retain the rear end of the bait-platform 13 between them and below the pivotal rod. This bait-platform 13 is provided at its rear end and at its upper side with the grooves 14, which are under and receive the under side of the pivotal rod, the lugs retaining the bait-platform against lateral movement upon the trap, and the grooves serve to form a pivotal bearing for the rear ends of the platform against the under side of the pivotal rod, as will be readily understood. Projecting upward from the rear end of the bait-platform just in front of the pivotal rod is an arm 16, having its upper end turned slightly rearward to form a shoulder 16', under which the free end of the setting or locking lever 17 engages when the trap is set. The outer end of the V-shaped portion 2 of the trap extends upward, as shown at 18, and provided with an opening 19, forming a transverse rod or bearing 20 for the eye of the locking-lever, as clearly shown. The pivoted end of the locking-lever is merely turned around this bearing, thus making a simple and effective construction.

It is common in traps of this character to have the smash-down bail itself coiled into a spring, but as the smash-down bail is made of wire having poor spring qualities it soon becomes weak and loses its power. We use practically a rigid smash-down bail and separate springs 21. These springs 21 have the coiled portion, as shown, through which the pivotal rod passes, one end of the coil extending into grooves 21' of upwardly-extending lugs 22. This serves to hold the springs in their proper relative position and against any longitudinal movement upon the pivotal rod or any movement in relation to the smash-down bail. The other end of the coil is elongated and extends outward, as shown at 23, and rests upon the transverse portion of the smash-down bail, as clearly illustrated. The coiled springs being made of fine steel do not lose their spring-power, thus producing a trap which does not lose its catching force and is quicker in action, while at the same time the bail can be made of smaller wire, for owing to the fact that the spring-power is applied at the end of the bail there is no spring to the bail as there is where the spring-power is applied at or near its inner end.

One edge of the rectangular portion, preferably the inner edge, as shown in Fig. 1, is serrated to form teeth 24, and the front edge of this rectangular portion is cut away to form a recess or passage 25 at a point under the front end of the smash-down bail to permit the finger to be inserted under the bail for raising it.

A yoke 26, essentially U-shaped in form, extends over the rear portion of the bait-platform and preferably in front of the pivotal rod, as shown. The function of this yoke is to form a bearing-point for the thumb, as shown in Fig. 4, so that the forefinger may be inserted under the front end of the smash-down bail through the recess in the front of the rectangular portion of the trap, whereby the smash-down bail is readily lifted, as clearly illustrated. This yoke provides a very convenient way of elevating the smash-down bail, as will be readily conceived, and a guard to prevent the animal springing the trap from the rear and thus escaping.

The trap may be secured at any point of its V-shaped portion 2, but to form a convenient fastening the V-shaped portion is provided with a bridge or web 27, under which a wire may be fastened for holding the trap against being carried away by the animal caught.

In Fig. 6 we show our construction somewhat modified to adapt the trap for catching mice, the modification being in the main for the purpose of cheapness. In this figure the yoke forming a bearing-point for the thumb is omitted, for the reason that the smash-down bail is under slight tension and is easily lifted and set, not requiring any bearing-point for the thumb, as in the rat-trap. In this construction we use but a single spring 30, the said spring being in form the same as the springs in the rat-trap. The rear end of the spring 31, however, instead of engaging a grooved or notched lug, as in the rat-trap, engages the upper face of the V-shaped portion of the base between the ribs 32 and 33 of the base, the said ribs serving to hold the spring against longitudinal movement upon the pivotal rod 34. The bait-platform is essentially the same construction and is held in position by a lug 35 and the inner end of the coil of the spring, as clearly shown. This lug serves to hold the pivotal rod against longitudinal movement, the same as the lugs in the rat-trap, which is hereinbefore specifically referred to. In other respects the mouse-trap is the same as the rat-trap, with the further exception that the serrations or teeth upon the rectangular portion of the base are omitted, as they are not necessary in a trap for catching mice.

From the above description it will be seen that we have produced a trap capable of being assembled and the parts held in their proper relative position without the use of rivets or solder, it being only necessary to assemble the several parts of the trap when they are held against displacement, as fully set forth.

Having thus described our invention, what we claim, and desire to secure by Letters Patent, is—

1. A trap comprising a base having a smash-down portion, a spring-actuated smash-down bail coacting therewith, a pivotal rod for the bail, and a bait or trip platform resting upon said base below said pivotal rod and having shoulders engaging said rod, whereby the platform is held in place by the pivotal rod and base, substantially as described.

2. A trap comprising a base having a smash-down portion, a spring-actuated smash-down bail, a pivotal rod therefor, a bait-platform projecting forward within the smash-down bail, the rear ends of the platform being pivotally supported, and a U-shaped yoke projecting upward and over the rear end of the bait-platform and spanning the rear end of the smash-down portion of the base, the yoke forming a guard to prevent the animal springing the trap and a bearing-point for the thumb in raising the forward end of the smash-down bail, substantially as described.

In testimony whereof we affix our signatures in presence of two witnesses.

NELSON R. STREETER.
JOSIAH ANSTICE.

Witnesses as to Nelson R. Streeter:
JAMES R. PIGMAN,
S. C. ELLIOTT.

Witnesses as to Josiah Anstice:
WM. C. COOPER,
JAS. L. WHITLEY.